(12) United States Patent
Lin et al.

(10) Patent No.: US 12,682,003 B2
(45) Date of Patent: Jul. 14, 2026

(54) METHOD, DEVICE, AND MEDIUM FOR SEARCHING CONTENT AND DISPLAYING SEARCHING RESULTS

(71) Applicant: Beijing Bytedance Network Technology Co., Ltd., Beijing (CN)

(72) Inventors: Yating Lin, Beijing (CN); Feng Zhao, Beijing (CN); Yanli Wang, Beijing (CN); Shuangshuang Jiang, Beijing (CN); Chao Qiao, Beijing (CN); Fan Wu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/262,185

(22) PCT Filed: Apr. 21, 2022

(86) PCT No.: PCT/CN2022/088064
§ 371 (c)(1),
(2) Date: Jul. 19, 2023

(87) PCT Pub. No.: WO2022/267658
PCT Pub. Date: Dec. 29, 2022

(65) Prior Publication Data
US 2024/0086484 A1 Mar. 14, 2024

(30) Foreign Application Priority Data
Jun. 22, 2021 (CN) .......................... 202110693309.3

(51) Int. Cl.
*G06F 16/9538* (2019.01)
*G06F 16/906* (2019.01)

(52) U.S. Cl.
CPC ........ *G06F 16/9538* (2019.01); *G06F 16/906* (2019.01)

(58) Field of Classification Search
CPC ... G06F 16/9538; G06F 16/906; G06F 16/953
See application file for complete search history.

(56) References Cited

U.S. PATENT DOCUMENTS 5,649,193 A * 7/1997 Sumita ..................... G06F 16/34
5,737,591 A * 4/1998 Kaplan ................. G06F 16/248
(Continued)

FOREIGN PATENT DOCUMENTS

CN        1311487 A  * 9/2001 ............. G06F 16/48
CN      103914543 A     7/2014
(Continued)

OTHER PUBLICATIONS

Liu, CN 106874467, machine translation (Year: 2025).*
(Continued)

*Primary Examiner* — Neveen Abel Jalil
*Assistant Examiner* — Hubert Cheung

(57) ABSTRACT

Provided are a content search method, apparatus, and device, and a storage medium. The present disclosure enables: receiving a search content; and displaying a plurality of answer viewpoints and first contents in a search result interface, wherein each answer viewpoint corresponds to one category of search results, the search results are results obtained by searching the search content, the first contents comprises keywords, the keywords are used for indicating reasons for displaying a target answer viewpoint among the plurality of answer viewpoints, and the keywords are extracted from a target category of search results corresponding to the target answer viewpoint.

18 Claims, 9 Drawing Sheets

(56)　　　　　References Cited

U.S. PATENT DOCUMENTS

| | | | | |
|---|---|---|---|---|
| 6,065,001 A * | 5/2000 | Ohkubo | ............... | G06F 16/355 |
| | | | | 707/700 |
| 6,675,197 B1 * | 1/2004 | Satoh | ................... | G06Q 10/107 |
| | | | | 709/204 |
| 11,334,572 B2 * | 5/2022 | Chen | ................ | G06F 16/24578 |
| 2002/0091684 A1 * | 7/2002 | Nomiyama | ........... | G06F 16/958 |
| 2014/0006012 A1 * | 1/2014 | Zhou | ................... | G06F 16/3344 |
| | | | | 704/9 |
| 2018/0181574 A1 * | 6/2018 | Chen | ................... | G06F 16/9535 |
| 2019/0370305 A1 * | 12/2019 | Liu | ..................... | G06F 16/3329 |
| 2020/0134023 A1 * | 4/2020 | Makino | ................. | G06N 20/00 |

FOREIGN PATENT DOCUMENTS

| | | | | | | |
|---|---|---|---|---|---|---|
| CN | 103927381 A | * | 7/2014 | ........ | G06F 16/2425 |
| CN | 104063497 A | * | 9/2014 | ........ | G06F 16/3344 |
| CN | 104102721 A | | 10/2014 | | |
| CN | 104881446 A | | 9/2015 | | |
| CN | 105068661 A | * | 11/2015 | ............ | G06F 16/00 |
| CN | 105159996 A | * | 12/2015 | ....... | G06F 17/30864 |
| CN | 105956181 A | | 9/2016 | | |
| CN | 106168962 A | | 11/2016 | | |
| CN | 106777236 A | | 5/2017 | | |
| CN | 106874467 A | | 6/2017 | | |
| CN | 104063497 B | * | 3/2018 | ........... | G06F 16/951 |
| CN | 108959531 A | | 12/2018 | | |
| CN | 104166676 B | | 4/2019 | | |
| CN | 109918560 A | | 6/2019 | | |
| CN | 110362817 A | | 10/2019 | | |
| CN | 106874467 B | * | 12/2019 | ........ | G06F 16/9535 |
| CN | 111339452 A | | 6/2020 | | |
| CN | 111708911 A | | 9/2020 | | |
| CN | 111858880 A | | 10/2020 | | |
| CN | 108959531 B | * | 12/2020 | ........... | G06F 18/214 |
| CN | 112035730 A | * | 12/2020 | ........... | G06F 40/232 |
| CN | 112287206 A | | 1/2021 | | |
| CN | 112948540 A | | 6/2021 | | |
| CN | 112989076 A | | 6/2021 | | |
| CN | 113392308 A | | 9/2021 | | |
| CN | 111309891 B | * | 5/2022 | ........ | G06F 16/3329 |
| JP | 5397198 B2 | * | 1/2014 | | |
| KR | 20170093713 A | * | 8/2017 | | |
| WO | 2009/004930 A1 | | 1/2009 | | |
| WO | WO-2021085085 A1 | * | 5/2021 | ............ | G06Q 10/06 |

OTHER PUBLICATIONS

International Search Report issued Jun. 27, 2022 in International Application No. PCT/CN2022/088064, with English translation (8 pages).

Hongjuan et al., "Towards Advances of Opinion Mining Based Bibliometrics Methods—a Potential Research Specialty of Information Science in the Future", Library and Information Knowledge, vol. 2, Feb. 2, 2010, pp. 55-63.

Office action received from Chinese patent application No. 202110693309.3 mailed on Apr. 18, 2024, 10 pages (4 pages English Translation and 6 pages Original Copy).

Xinghong Z., "Common errors in keyword indexing of scientific journal articles and their regulatory requirements", Journal of Northwest University for Nationalities, vol. 34, No. 1, Mar. 17, 2013, pp. 92-95.

Written Opinion for International Application No. PCT/CN2022/088064, mailed Jun. 27, 2022, 09 Pages.

\* cited by examiner

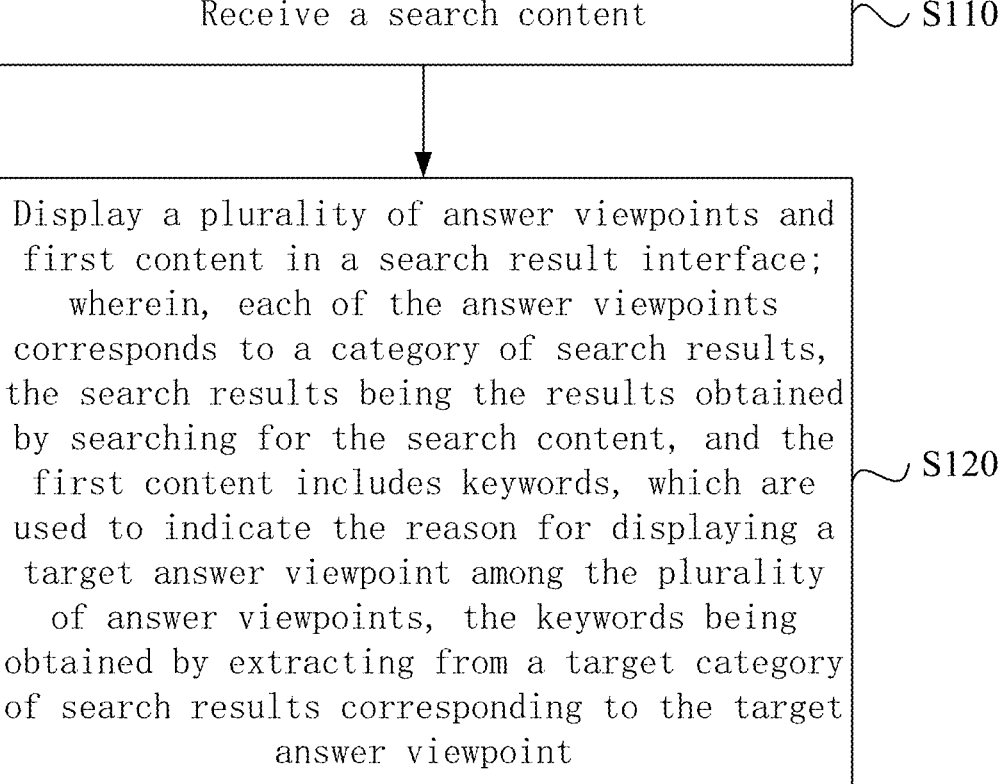

Receive a search content ~ S110

Display a plurality of answer viewpoints and first content in a search result interface; wherein, each of the answer viewpoints corresponds to a category of search results, the search results being the results obtained by searching for the search content, and the first content includes keywords, which are used to indicate the reason for displaying a target answer viewpoint among the plurality of answer viewpoints, the keywords being obtained by extracting from a target category of search results corresponding to the target answer viewpoint ~ S120

METHOD, DEVICE, AND MEDIUM FOR SEARCHING CONTENT AND DISPLAYING SEARCHING RESULTS

CROSS-REFERENCES TO RELATED APPLICATIONS

This application is a U.S. National Stage Application under 35 U.S.C. § 371 of PCT International Application No. PCT/CN2022/088064 filed on Apr. 21, 2022, which is based on and claims priority to the Chinese Application No. 202110693309.3, filed to the China National Intellectual Property Administration on Jun. 22, 2021, the disclosure of both of which are hereby incorporated by reference herein in their entireties.

TECHNICAL FIELD

The present disclosure relates to the technical field of content search, and in particular, to a content search method, apparatus, device and medium.

BACKGROUND

Search Engine refers to a system that collects information on the Internet according to certain strategies and uses specific computer programs, and provides users with retrieval services after organizing and processing the information. The emergence of search engines provides convenience for users to use network information, and users can retrieve the information they need from the massive data provided by the Internet.

SUMMARY

The disclosure provides a content search method, apparatus, device and medium.

In a first aspect, the present disclosure provides a content search method, comprises:

receiving a search content;

displaying a plurality of answer viewpoints and first content in a search result interface; wherein, each of the answer viewpoints corresponds to a category of search results, the search results being the results obtained by searching for the search content, and the first content includes keywords, which are used to indicate the reason for displaying a target answer viewpoint among the plurality of answer viewpoints, the keywords being obtained by extracting from a target category of search results corresponding to the target answer viewpoint.

In a second aspect, the present disclosure provides a content search apparatus, comprising:

a content receiving unit configured to receive a search content;

a first display unit configured to display a plurality of answer viewpoints and first content in a search result interface; wherein, each of the answer viewpoints corresponds to a category of search result, the search results being the results obtained by searching for the search content, and the first content includes keywords, which are used to indicate the reason for displaying a target answer viewpoint among the plurality of answer viewpoints, the keyword being obtained by extracting from a target category of search results corresponding to the target answer viewpoint.

In a third aspect, the present disclosure provides a content search device, comprising:

a processor;

a memory for storing executable instructions;

wherein, the processor is used to read the executable instructions from the memory, and execute the executable instructions to implement the content search method described in the first aspect.

In a fourth aspect, the present disclosure provides a computer-readable storage medium having computer programs stored thereon, which, when executed by a processor, causes the processor to implement the content search method described in the first aspect.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the like or similar reference signs indicate the like or similar elements. It should be understood that the drawings are schematic and the originals and elements are not necessarily drawn to scale.

FIG. 1 is a schematic flowchart of a content search method provided by an embodiment of the present disclosure;

DETAILED DESCRIPTION

Figure 2:
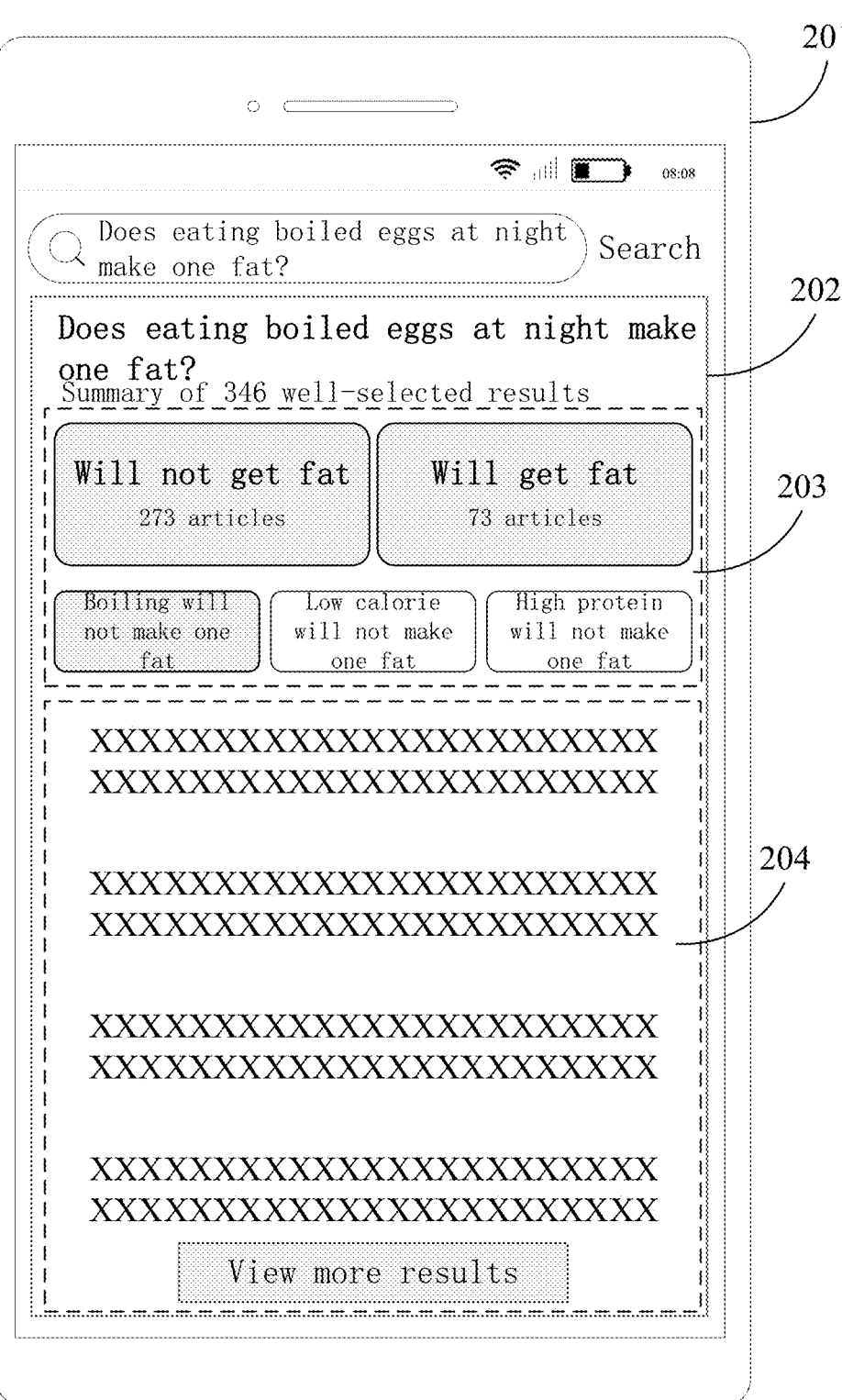
FIG. 2 is a schematic diagram of a search result interface provided by an embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that, the drawings and embodiments of the present disclosure should be explained as merely illustrative, and not as a limitation to the protection scope of the present disclosure.

It should be understood that various steps recited in the method embodiments of the present disclosure can be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules, or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

In existing search engines, when a user performs content search, the user usually needs to analyze a large amount of displayed search results to obtain the required content, resulting in low efficiency for the user to obtain information and reducing user experience.

In existing search engines, when a user inputs search content for information searching, the displayed search results are often not comprehensive or concise enough. For example, when a user searches for opinions/answers/solutions, the search results presented by the search engines are either a best answer selected from a candidate set to display a precise result that meets the needs, or sorting the network-wide results searched according to a comprehensive score of certain attributes to display all the results that meet the needs, resulting in the search results are often not comprehensive enough or the presentation methods are not intuitive and concise, as a result, users need to perform secondary analysis on the large number of displayed search results to obtain the required content, which affects the efficiency of the users to obtain information and reduces the user experience.

In order to solve the above problems, embodiments of the present disclosure provide a content search method, apparatus, device and medium that can present more search results more comprehensively and intuitively in a search scenario where there are at least two viewpoints.

A content search method provided by an embodiment of the present disclosure will first be described below with reference to FIGS. 1-8.

In an embodiment of the present disclosure, the content search method may be executed by an electronic device. Wherein, the electronic device may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), a wearable device, etc., and a fixed terminal such as a digital TV, a desktop computer, a smart home device, etc.

FIG. 1 shows a schematic flowchart of a content search method provided by an embodiment of the present disclosure. As shown in FIG. 1, the content search method may include the following steps.

S110. Receive Search Content.

Wherein, the search content refers to the content input by a user, which requires a search engine to execute a search operation and feed back search results, which may be keywords or complete long and short sentences.

In an embodiment of the present disclosure, optionally, the search content may be content for seeking an answer, or a viewpoint, or a solution etc.

In an embodiment of the present disclosure, the electronic device may receive search content input by a user in a content search page of a specific application or a specific website.

In some embodiments, a user can input information in any form of text, voice, and image etc. in a search box on a content search page, so that the electronic device will use the text corresponding to the information input by the user as the search content input by the user.

For example, the user may input text information "does eating boiled eggs at night make one fat" in the search box on the content search page, and the electronic device may use "does eating boiled eggs at night make one fat" as the search content, and then search for the contents associated with "does eating boiled eggs at night make one fat" for the user.

For another example, the user may input voice information "does eating boiled eggs at night make one fat" in the search box on the content search page, and the electronic device may perform voice recognition processing on the voice information to obtain the search content "does eating boiled eggs at night make one fat", and then search for contents associated with "does eating boiled eggs at night make one fat" for the user.

For yet another example, the user may input an image with the text "does eating boiled eggs at night make one fat" or an image with picture content of "does eating boiled eggs at night make one fat" in the search box on the content search page, and the electronic device may perform image text recognition processing or image content recognition processing on the image to obtain the search content "does eating boiled eggs at night make one fat", and then search for contents associated with "does eating boiled eggs at night make one fat" for the user.

In some other embodiments, a plurality of candidate search contents may be displayed on the content search page, and the user may select among the displayed candidate search contents, such that the electronic device uses a candidate search content selected by the user as the search content.

For example, the content search page may display candidate search contents such as "does eating boiled eggs at night make one fat", "how to eat eggs without getting fat" and "what are the foods suitable for fat loss", etc., and the user may select "does eating boiled eggs at night make one fat", so that the electronic device may use "does eating boiled eggs at night make one fat" selected by the user as the search content, and then search for contents associated with "does eating boiled eggs at night make one fat" for the user.

Specifically, after the electronic device receives the search content input by the user, the search content may be sent to a server. The server may search for the search content and obtain all search results, which may be at least one of article, picture, audio, video, and the like. For example, the server may extract data related to the search content from the database for the search content as all search results of the search content by reading a comprehension model. Then, the server preliminarily selects high-authoritative search results coming from authoritative institutions or persons from all search results, and/or preliminarily selects high-quality search results with more information content and higher relevance, as a candidate search result set for subsequent search processing. Afterwards, the server extracts information from the candidate search result set to obtain answer viewpoints corresponding to various search results related to the search content and the arguments supporting each of the answer viewpoints. For example, the server uses an article understanding technology to pre-extract the central idea elaborated by the article, and obtain an answer viewpoint related to the title of the article, as well as keywords supporting the answer viewpoint.

In an embodiment of the present disclosure, each answer viewpoint may be extracted from the candidate search result set.

In some embodiments, if the search content belongs to a two-viewpoint question, the server performs binary classification on the candidate search result set to obtain binary classification results; aggregates the binary classification results to obtain two answer viewpoints corresponding to the search content. That is, regarding search content that belongs to a two-viewpoint question with opposing answer viewpoints, the server first uses a machine learning model to perform binary classification on the candidate search result set to obtain two categories of search results. Then, the server aggregates the candidate search result set according to the binary classification results to obtain two opposing answer viewpoints of the search content.

In some other embodiments, if the search content belongs to a multi-viewpoint question, the server performs core viewpoint extraction on the candidate search result set, and performs viewpoint voting and clustering on the core viewpoint extraction results to obtain a plurality of answer viewpoints corresponding to the search content. That is, regarding search content that belongs to a multi-viewpoint question with more than two viewpoints, the server first uses a short answer extraction model to extract core viewpoints of each search result in the candidate search result set, and then uses a question-based natural language reasoning model to vote on each core viewpoint, and performs final clustering to obtain a plurality of answer viewpoints of the search content. Afterwards, the server classifies the search results in the candidate search result set according to the obtained answer viewpoints, to obtain a category of search results corresponding to each answer viewpoint. For example, various search results that yield the same answer viewpoint in the candidate search result set are divided into one category.

In an embodiment of the present disclosure, for obtaining arguments (i.e., keywords) supporting viewpoint answers, the arguments supporting respective answer viewpoints may be extracted from a category of search results corresponding to each answer viewpoint.

In some embodiments, for each answer viewpoint, the server first extracts key phrases from a category of search results corresponding to the answer viewpoint to mine out a keyword set. Then, the correlation between each keyword in the keyword set and the answer viewpoint is calculated, and all keywords are sorted, deduplicated and selected etc., according to the correlation result to obtain a plurality of keywords under the answer viewpoint. The selection operation here may be to intercept keywords from the keyword set according to principles such as relevance or quantity etc.

In some other embodiments, the server may pre-train a keyword extraction model, and then, with a category of search results corresponding to a certain answer viewpoint as input, output a set of keywords corresponding to the answer viewpoint through the operation of the keyword extraction model. The set of keywords can be directly used as a plurality of keywords under the answer viewpoint, or the set of keywords can be performed post-processing such as sorting, deduplicating and selecting, to use the finally obtained plurality of keywords as arguments for the answer viewpoint.

Through the above process, the server obtains answer viewpoints relevant to the search content, keywords corresponding to each answer viewpoint and a category of search results, and feeds back any of above information required by the electronic device.

S120. Display a plurality of answer viewpoints and first content in a search result interface; wherein, each of the answer viewpoints corresponds to a category of search results, the search results being the results obtained by searching for the search content, and the first content includes keywords, which are used to indicate the reason for displaying a target answer viewpoint among the plurality of answer viewpoints, the keywords being extracted from a target category of search results corresponding to the target answer viewpoint.

Wherein, the search result interface may be used to display to a user information associated with the search content input by the user. In an embodiment of the present disclosure, the search result interface may at least display a plurality of answer viewpoints and the first content corresponding to the search content. The first content refers to the content other than the answer viewpoint displayed in the search result interface. In an embodiment of the present disclosure, the first content contains at least keywords under a certain answer viewpoint (namely, the target answer viewpoint), which is used to present reasons for obtaining the target answer viewpoint for the search content more intuitively and concisely, so that the user can obtain information more quickly. The target category of search results refers to a category of search results corresponding to the target answer viewpoint.

Specifically, the electronic device obtains corresponding information from the server according to information that may displayed by the search result interface. For example, the electronic device receives a plurality of answer viewpoints and keywords under a target answer viewpoint sent by the server. Then, the electronic device displays the plurality of answer viewpoints and the keywords under the target answer viewpoint on the search result interface. The display position and display style of the plurality of answer viewpoints in the search result interface, as well as the positional relationship and display style between keywords and answer viewpoints are not limited.

To sum up, the content search method in the embodiments of the present disclosure, when searching for the search content, can display first content in the search result interface while displaying answer viewpoints corresponding to various search results obtained by searching in the search result interface, for example, keywords extracted from target search results corresponding to a target answer viewpoint in these answer viewpoints, then reasons for displaying the target answer viewpoints can be presented to the user through the keywords directly without the need for the user to analyze a large number of search results, so that the user can understand the supporting arguments of the target answer viewpoint quickly, improving the comprehensiveness and refinement of search results presented by search engines, thereby improving the efficiency of screening search results and further improving user experience.

In yet another implementation of the present disclosure, in order to further enhance the intuition and importance of certain information in the search result interface, the display style of the answer viewpoint is further limited in the embodiments of the present disclosure.

In some embodiments, a target answer viewpoint is an answer viewpoint displayed as selected state. In order to facilitate a user to determine which answer viewpoint a keyword in a first content belongs to, in the embodiment, the display style of a target answer viewpoint is set as a display style corresponding to a selected state. Here, the display style corresponding to the selected state can be at least one of the display styles such as the control where the target answer viewpoint is located has a border, the control has shading, the control is enlarged, and the text in the control is bold, italic, or different in color, etc., as long as it can be distinguished from the display style corresponding to an unselected state.

FIG. 2 shows a schematic diagram of a search result interface provided by an embodiment of the present disclosure.

As shown in FIG. 2. the electronic device 201 may display a search result interface 202 for searching for "does eating boiled eggs at night make one fat". At the top of the search result interface 202, there is displayed the search content "does eating boiled eggs at night make one fat" and the number of search results in the candidate search result set obtained by searching for it: "summary of 346 well-selected results". In the middle area 203 of the search result interface 202, two answer viewpoints of "will not get fat" and "will get fat" are displayed horizontally, as well as keywords such as "boiling will not make one fat", "low calorie will not make one fat", "high protein will not make one fat" etc. displayed below the two answer viewpoints in the middle area 203. At the same time, the target answer viewpoint "will not get fat" is displayed as a selected state with shading.

In the lower area 204 of the search result interface 202, there is displayed a plurality of search results. These search results can be part of all search results for the search content, part of the target category of search results for the target answer viewpoint with selected state, or part of the search results for a certain keyword in the target answer viewpoint. The plurality of search results displayed in the lower area 204 should be the results after comprehensively sorting according to dimensions such as relevance to the search content and importance of the search results, etc.

In yet another implementation of the present disclosure, in order to further enhance the intuition and importance of certain information in the search result interface, the display order of the answer viewpoints is further limited in the embodiments of the present disclosure.

In some embodiments, the display order of a plurality of answer viewpoints in the search display interface may be randomly arranged.

In some other embodiments, a plurality of answer viewpoints are arranged and displayed according to the order of target viewpoints, and the order of target viewpoints is determined according to the number of a category of search results corresponding to each answer viewpoint; and the target answer viewpoint is the first of the answer viewpoints. Considering that there are a plurality of answer viewpoints, and the importance of each answer viewpoint is different, in order to further reduce the process for user to screen information, in the embodiment, the plurality of answer viewpoints are sorted and displayed according to the number of search results in a category of search results corresponding to each answer viewpoint. This is because the number of search results can largely reflect the number of people supporting respective answer viewpoint, which also reflects the importance of the respective answer viewpoint. On this basis, the target answer viewpoint is set as the first answer viewpoint, that is, the answer viewpoint with the most support. In this way, keywords under the target answer viewpoint can also be displayed first, so that users can directly see the answer viewpoint and argument with the most support rate.

Continuing to refer to FIG. 2. in the middle area 203 of the search result interface 202. the number of search results in a category of search results corresponding to respective answer viewpoint may also be displayed below each answer viewpoint. For example, "273 articles" is displayed under the answer viewpoint "will not get fat", and "73 articles" is displayed under the answer viewpoint "will get fat". The two answer viewpoints are arranged according to the number of articles. For example, "will not get fat" with larger number of articles is arranged before "will get fat" with smaller number of articles. At the same time, the first answer viewpoint of "will not get fat" is confirmed as the target answer viewpoint, and it is displayed as selected with shading.

In yet another implementation of the present disclosure, in order to further enhance the intuition and importance of certain information in the search result interface, the display position of the answer viewpoint and/or the first content is further limited in the embodiment of the present disclosure.

In some embodiments, a plurality of answer viewpoints are displayed in the same area, and the first content is displayed in the display area to which the plurality of answer viewpoints belong. In this embodiment, the plurality of answer viewpoints are displayed in the same area of the search result interface. For example, the plurality of answer viewpoints are displayed horizontally in the same area. The first content is also displayed in the area where the answer viewpoints are located. For example, the first content is displayed on peripheral positions such as above, below, left, or right of the plurality of answer viewpoints. This display method is applicable not only to the display of search results for two-viewpoint questions, but also to the display of search results for multi-viewpoint questions. In this way, it is convenient for users to first understand all the answer viewpoints, and then view keywords according to their needs.

Continuing to refer to FIG. 2. the two answer viewpoints of "will not get fat" and "will get fat" are displayed in the middle area 203 horizontally, and multiple keywords are displayed below the answer viewpoints in the middle area 203.

In some other embodiments, a plurality of answer viewpoints are displayed in different areas, and the first content is displayed in the display area to which the target answer viewpoint belongs. In this embodiment, each answer viewpoint is displayed in different areas of the search result interface. For example, a plurality of answer viewpoints are displayed vertically, and each row is a display area, which is only used to display one answer viewpoint. The first content belonging to a certain answer viewpoint is displayed in the display area where the answer viewpoint is located. For example, a plurality of keywords belonging to the target answer viewpoint are displayed in the display area where the target answer viewpoint is located, and these keywords may be displayed at positions in different orientations such as up, down, left, and right of the target answer viewpoint. This display method is also applicable to the display of search results for two-viewpoint questions and multi-viewpoint questions. In this way, the answer viewpoints and keywords can be displayed more comprehensively, and it is especially suitable for a situation where there are many answer viewpoints and keywords.

Figure 3:
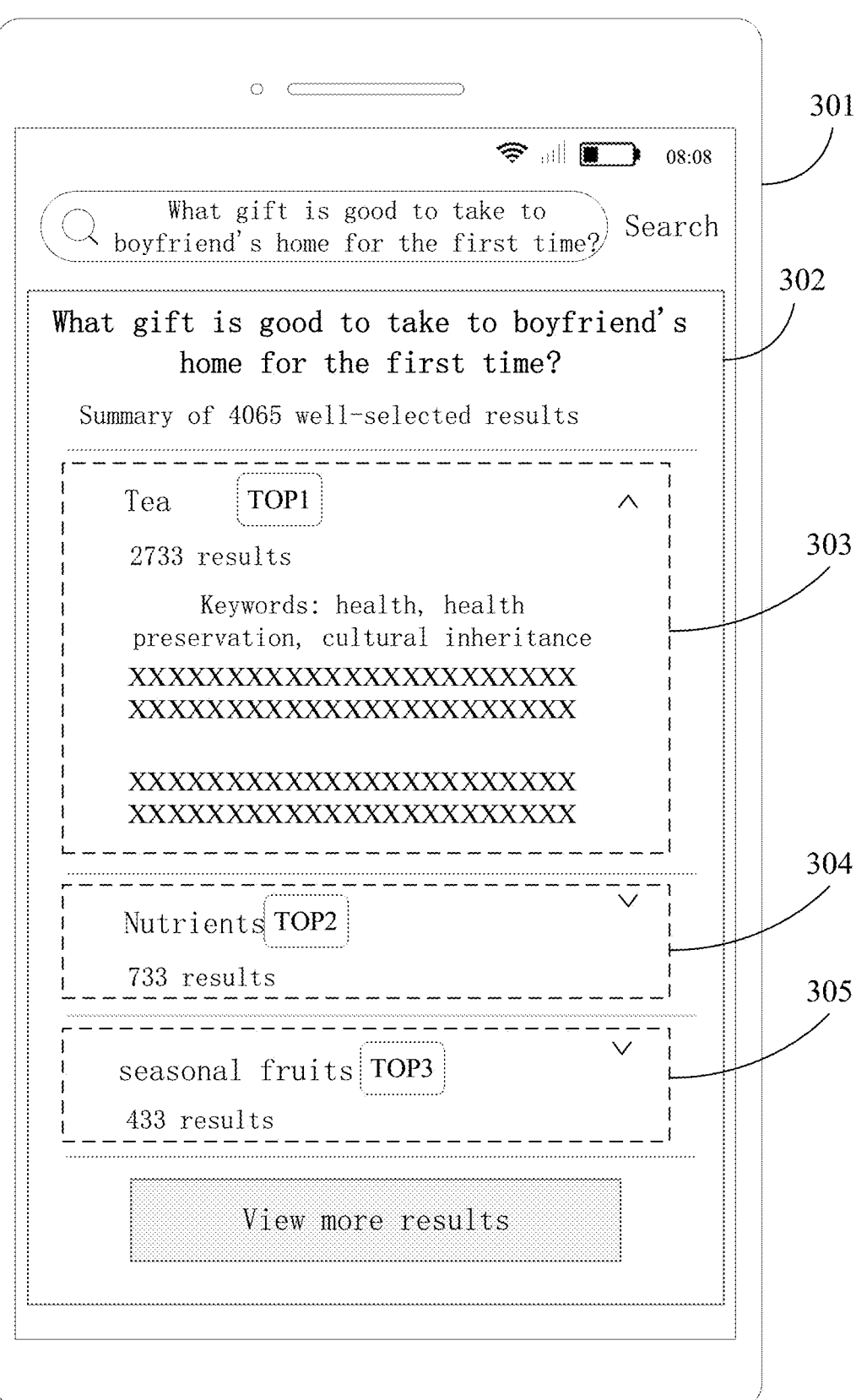
FIG. 3 is a schematic diagram of another search result interface provided by an embodiment of the present disclosure.

FIG. 3 shows a schematic diagram of another search result interface provided by an embodiment of the present disclosure.

As shown in FIG. 3, the electronic device 301 may display a search result interface 302 for searching for "what gift is good to take to boyfriend's home for the first time". At the top of the search result interface 302, there is displayed the search content "What gift is good to take to boyfriend's home for the first time" and the number of search results in the candidate search result set obtained by searching for it: "summary of 4065 well-selected results". In the first area 303, the second area 304 and the third area 305 of the search result interface 302, a plurality of answer viewpoints of "tea", "nutrients" and "seasonal fruits" are vertically displayed respectively. The number of search results corresponding to one category is displayed below each answer viewpoint, and "tea", "nutrients" and "seasonal fruits" are arranged in descending order according to the number of search results 2733, 733 and 433 respectively. Under the "tea" viewpoint in the first region 303, there are also displayed corresponding keywords "health", "health preservation", "cultural inheritance", as well as a plurality of search results corresponding to the "tea" viewpoint or a certain keyword. The target answer viewpoint "tea" is in a selected state in a manner of displaying further content such as keywords by pulling down.

Figure 4:
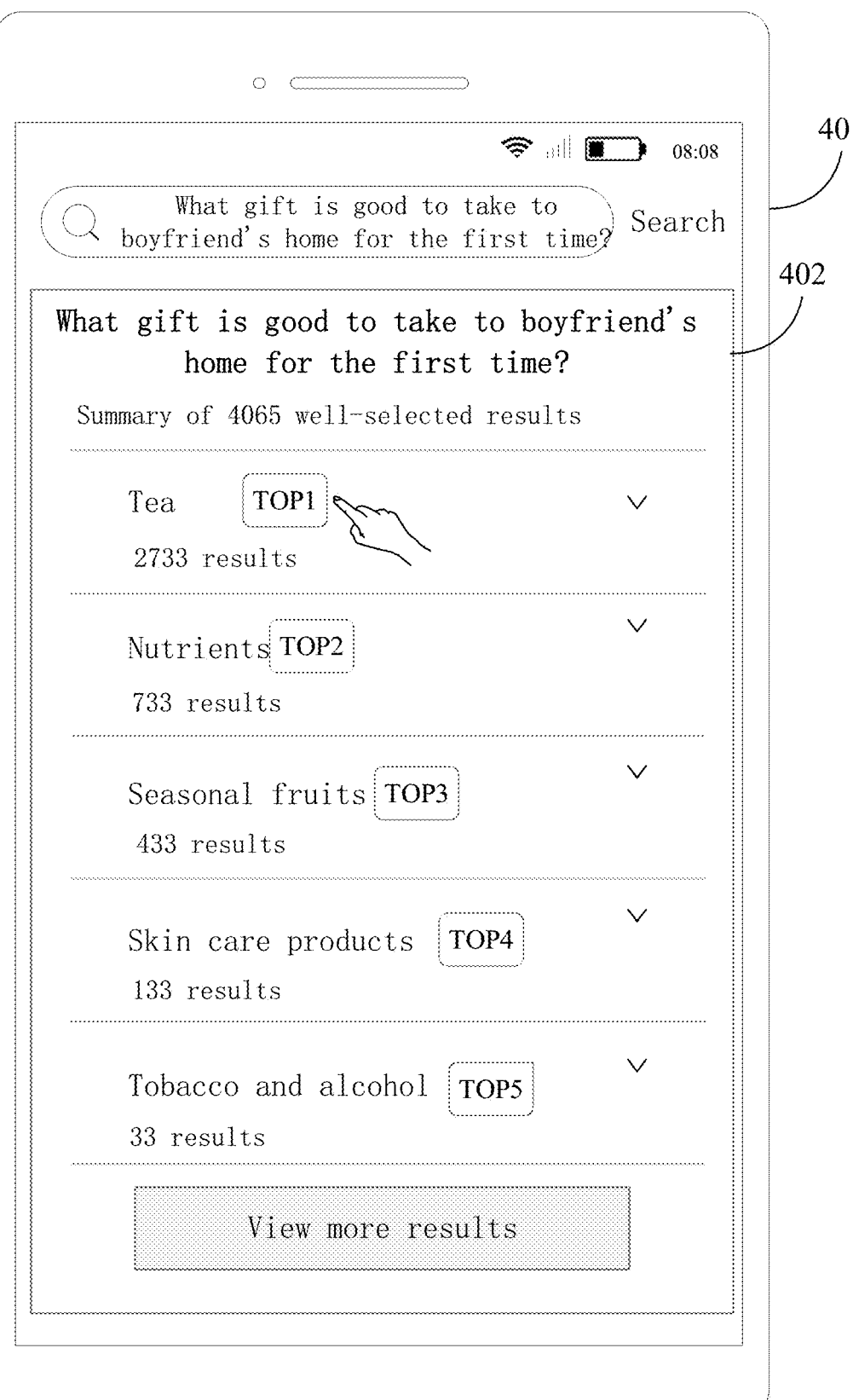
FIG. 4 is a schematic diagram of another search result interface provided by an embodiment of the present disclosure.

In still some embodiments, before S120, a plurality of answer viewpoints are displayed in the search result interface. In this embodiment, only a plurality of answer viewpoints are displayed in the initial state of the search result interface. Taking the search content as "what gift is good to give to boyfriend's home for the first time" as an example, as shown in FIG. 4, the electronic device 401 displays the search result interface 402, in which answer viewpoints such as "tea", "nutrients", "seasonal fruits", "skin care products" and "tobacco and alcohol" and the like are displayed vertically, as well as the number of a category of search results corresponding to each answer viewpoint.

Based on this embodiment, S120 includes: when a first trigger operation is detected, displaying a first content in a search result interface, the target answer viewpoint being the answer viewpoint selected by the first trigger operation.

Optionally, the first trigger operation may include an operation for controlling the display of the first content in the search result interface, such as a gesture control operation, a voice control operation, or an expression control operation on the search result interface, which is not limited here.

In this embodiment, the display of the first content is triggered by the user. For example, in FIG. 4, when the user clicks on the target answer viewpoint "tea", the first content containing at least keywords will be drop-down displayed in the display area where "tea" is located, as shown in FIG. 3.

In yet another implementation of the present disclosure, the switch display of answer viewpoints after the first content is displayed is limited.

In some embodiments, after S120, when a third trigger operation is detected, the first content is replaced with the third content for display; wherein, the third content includes a keyword, and the keyword is used to indicate the reason for displaying other answer viewpoint corresponding to the third trigger operation, and the keyword is extracted from other categories of search results corresponding to the other answer viewpoint, and the other categories of search results are a category of search results corresponding to other answer viewpoints.

Optionally, the third triggering operation may include an operation for controlling the display of the third content in the search result interface, such as a gesture control operation, a voice control operation, or an expression control operation on the search result interface, which is not limited here.

In this embodiment, after the first content is displayed, after the user triggers other answer viewpoints different from the target answer viewpoint, the third content corresponding to the other answer viewpoints may be displayed in the search result interface instead of the first content.

In one example, when a plurality of answer viewpoints are displayed in the same area, the first content is hidden and the third content is displayed in the same area as the first content. In addition, in order to highlight other answer viewpoints, the target answer viewpoint may be displayed as an unselected state, and other answer viewpoints corresponding to the third trigger operation may be displayed as a selected state.

In another example, when a plurality of answer viewpoints are displayed in different areas, the first content drop-down displayed in the target answer viewpoint is collapsed, and only the target answer viewpoint and the number of search results are displayed. At the same time, in the display area corresponding to other answer viewpoints, the third content is drop-down displayed.

In yet another implementation of the present disclosure, in order to further increase the information content and intuitiveness of the search results in the search result interface, the information contained in the first content is further limited in the embodiment of the present disclosure.

In some embodiments, the first content further includes a summary of answer viewpoints, which is generated according to a target category of search results.

Wherein, the summary of answer viewpoints refers to a summary generated for a certain answer viewpoint, which can display information of the answer viewpoint in more detail and comprehensively.

In an embodiment of the present disclosure, the summary of answer viewpoints is generated according to all search results corresponding to the answer viewpoints. For example, the content of the summary includes at least the number of xx authoritative articles or people who support it, and core points of each article supporting the answer viewpoint. If the core points are too long, they need to be rewritten appropriately. The final form of the summary generated can be: there are xx authoritative people believe+ answer viewpoint+core evidence supporting the answer viewpoint+places in one or several certain authoritative articles that have objections or need to be attention to.

Taking the search content "does eating boiled eggs at night make one fat" and the target answer viewpoint "will not get fat" as an example, the summary of the answer viewpoint obtained through the above method can be: "xxx, xxx and other more than 2,000 nutritionists from Three-A hospitals recommend"+Core viewpoint: Eating boiled eggs at night will not get fat+evidences: because boiled eggs contain ingredients of eggs themselves, without salt, oil and sugar, they are very healthy food+Notes or objections: but you should pay attention to the time when eating at night and do not eat food two hours before going to bed.

Figure 5:
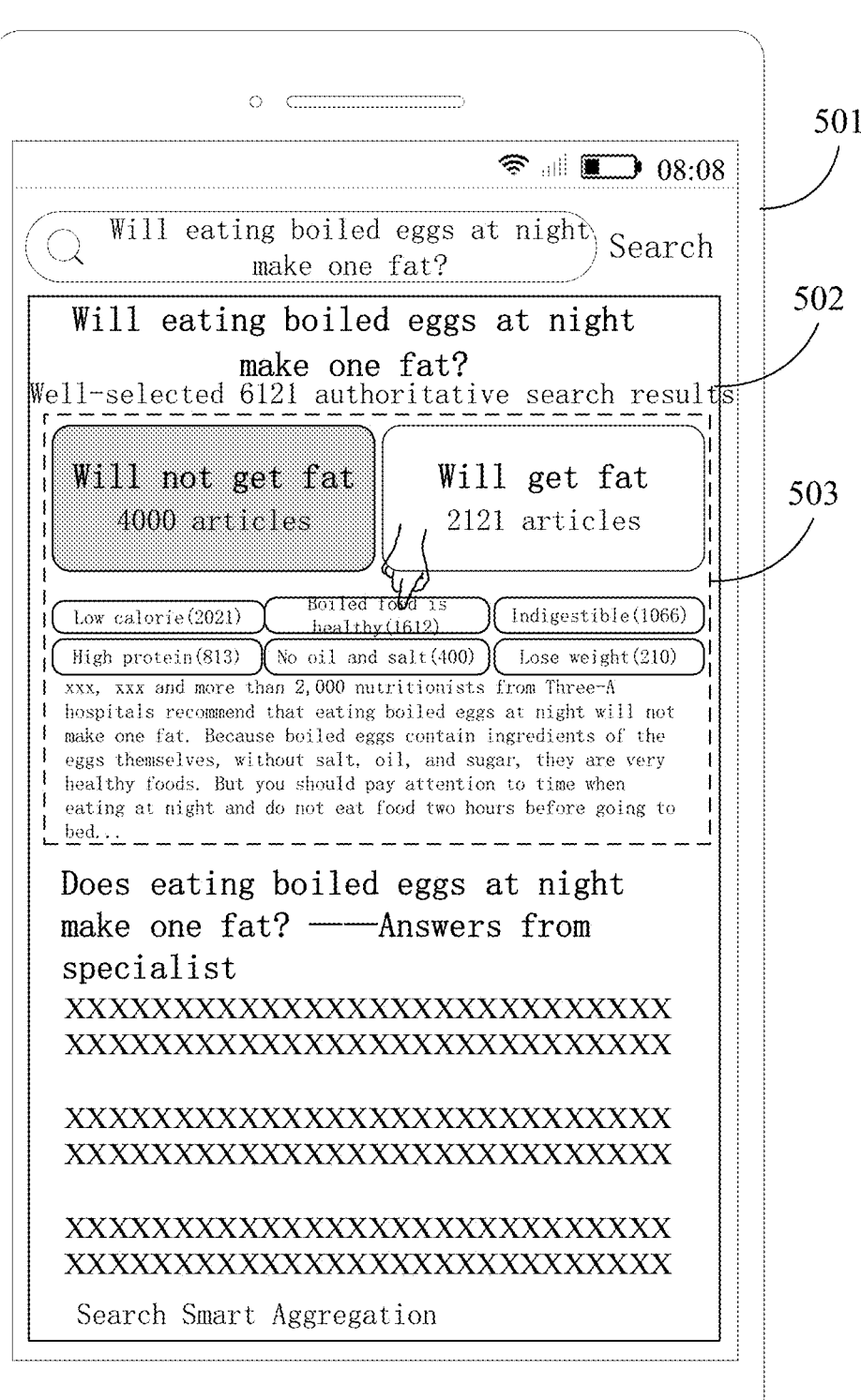
FIG. 5 is a schematic diagram of yet another search result interface provided by an embodiment of the present disclosure.

FIG. 5 shows a schematic diagram of another search result interface provided by an embodiment of the present disclosure.

As shown in FIG. 5. the electronic device 501 may display a search result interface 502 for searching for "does eating boiled eggs at night make one fat". At the top of the search result interface 502, there are displayed the search content "does eating boiled eggs at night make one fat" and the number of search results in the candidate search result set obtained by searching for it: "6121 well-selected authoritative search results". In the middle area 503 of the search result interface 502, there are displayed horizontally two answer viewpoints of "will not get fat" and "will get fat", the numbers of search results of each answer viewpoint "4000 articles" and "2121 articles", and keywords such as "low calorie", "boiled food is healthy", "indigestible", "high protein", "no oil and salt" and "lose weight" and the like displayed below the two answer viewpoints in the middle area 503. Below the keywords, there is also displayed a summary of the answer viewpoint corresponding to the target answer viewpoint "will not get fat" presented as selected state: "xxx, xxx, etc. more than 2,000 nutritionists from Three-A hospitals suggest that eating boiled eggs at night will not make one fat. Because boiled eggs contain ingredients of the eggs themselves, without salt, oil, and sugar, they are very healthy food. But you should pay attention to the time when eating at night, and do not eat food two hours before going to bed . . . ".

In addition, a comprehensive search result may be displayed in the lower area of the search result interface 502, that is, a comprehensive ranking result of a plurality of search results for the search content.

In some other embodiments, the first content may also include the number of search results corresponding to each keyword in the target category of search results. In this embodiment, for each keyword, the number of search results corresponding to respective keyword is counted.

For example, in FIG. 5, the numbers of search results for keywords such as "low calorie", "boiled food is healthy", "indigestible", "high protein", "no oil and salt" and "lose weight" are displayed in parentheses behind respective keyword, respectively.

In another implementation of the present disclosure, richer search result information may also be displayed on the search result interface.

In some embodiments, a second content is also displayed in the search result interface; wherein, the second content includes at least one of a keyword summary and a target search result, and the keyword summary is generated according to the target search result, and the target search result is the search result of a target keyword among keywords involved in a target category of search results.

Wherein, the keyword summary refers to a summary generated for a certain keyword, which can display information of the keyword in more detail and comprehensively. The keyword summary is generated according to search results (that is, target search results) of a target keyword involved in a target category of search results corresponding to a target answer viewpoint containing a target keyword. The structure and generation method of the keyword summary may be the same as the structure and generation method of the summary of the answer viewpoint.

In this embodiment, in order to further increase the information content of search results, in addition to displaying a plurality of answer viewpoints and a first content in a search result interface, there is also displayed a second content, and the second content may be a keyword summary of a target keyword, may also be a target search result, or may be a combination of a keyword summary and a target search result.

In some embodiments, the target keyword is a keyword displayed in a selected state. In order to facilitate the user to determine which keyword the second content belongs to, in this embodiment, the display style of the target keyword is set as the display style corresponding to the selected state.

Figure 6:
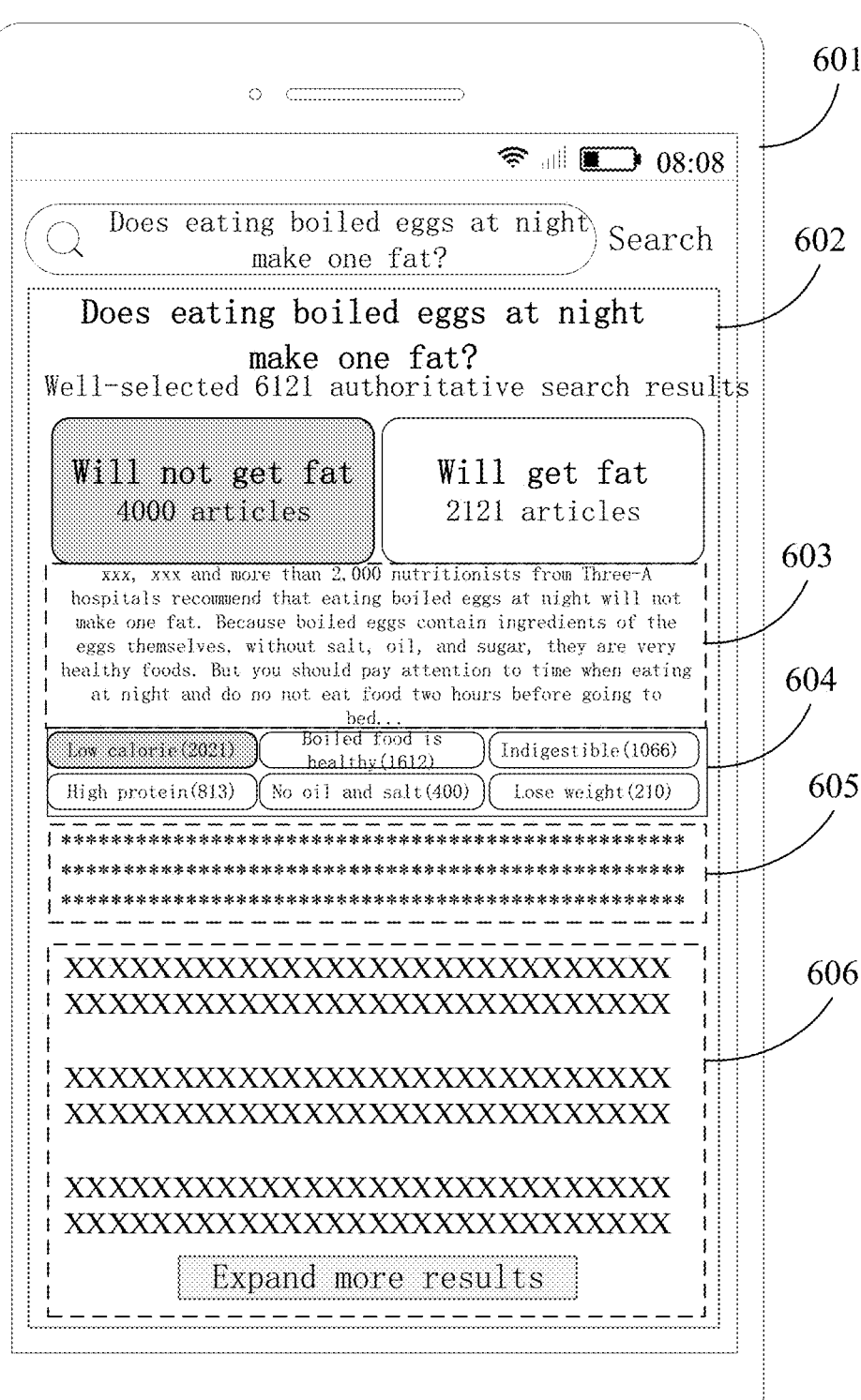
FIG. 6 is a schematic diagram of yet another search result interface provided by an embodiment of the present disclosure.

In one example, the search result interface may simultaneously display the first content including keywords and a summary of answer viewpoints, and the second content. FIG. 6 shows a schematic diagram of yet another search result interface provided by an embodiment of the present disclosure.

As shown in FIG. 6. the electronic device 601 may display a search result interface 602 for searching for "does eating boiled eggs at night make one fat". At the top of the search result interface 602, there are displayed the search content "does eating boiled eggs at night make one fat" and the number of search results in the candidate search result set obtained by searching for it: "6121 well-selected authoritative search results". There are two answer viewpoints of "will not get fat" and "will get fat" displayed horizontally below it, as well as the numbers of search results of each answer viewpoint "4000 articles" and "2121 articles". Below the answer viewpoint, a summary of the answer viewpoint 603 of the target answer viewpoint "will not get fat" is displayed, and the keyword 604 is displayed below the summary of the answer viewpoint 603, and the keyword summary 605 of the target keyword "low calorie" in selected state is also displayed below the keyword 604, while the target search results 606 for the target keyword may also be displayed below the keyword summary 605.

It should be noted that the arrangement order among the summary of answer viewpoint 603, the keywords 604, the keyword summary 605 and the target search results 606 can be exchanged, but it is necessary to ensure that the relationship between various contents is clear. For example, the summary of answer viewpoint needs to show that it is a summary of a target answer viewpoint, and the keyword summary needs to show that it is a summary of a target keyword, and the target search results need to show that they are a plurality of search results corresponding to a target keyword.

Figure 7:
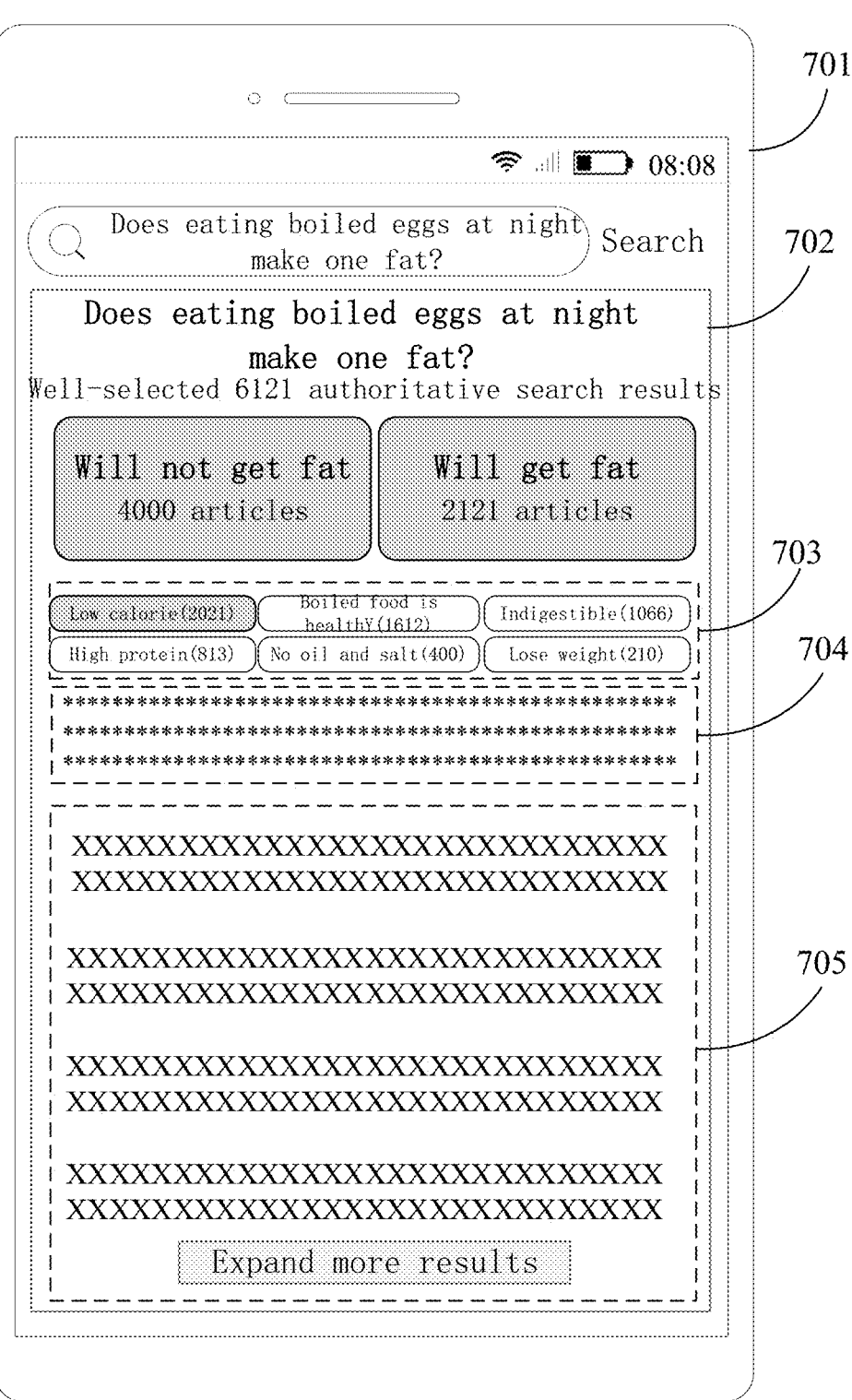
FIG. 7 is a schematic diagram of yet another search result interface provided by an embodiment of the present disclosure.

In another example, the search result interface may simultaneously display the first content containing only keywords, and the second content. FIG. 7 shows a schematic diagram of yet another search result interface provided by an embodiment of the present disclosure.

As shown in FIG. 7, the electronic device 701 may display a search result interface 702 for searching for "does eating boiled eggs at night make one fat". At the top of the search result interface 702, there are displayed the search content "does eating boiled eggs at night make one fat" and the number of search results in the candidate search result set obtained by searching for it: "6121 well-selected authoritative search results". There are two answer viewpoints of "will not get fat" and "will get fat" displayed horizontally below it, as well as the numbers of search results of each answer viewpoint "4000 articles" and "2121 articles". A keyword 703 is displayed below the answer viewpoint, and a keyword summary 704 of the target keyword "low calorie" is also displayed below the keyword 703, while a target search result 705 for the target keyword can also be displayed below the keyword summary 704. It should be understood that there may be displayed only one of the keyword summary 704 and the target search result 705.

In yet another implementation of the present disclosure, in order to further enhance the intuition and importance of certain information in the search result interface, the display order of keywords is further limited in the embodiment of the present disclosure.

In some embodiments, a plurality of keywords are randomly arranged.

In some other embodiments, keywords are arranged and displayed according to the order of target keywords, and the order of target keywords is determined according to the number of search results corresponding to each keyword in a target category of search results; wherein, the target keyword is the first keyword.

Considering that there are a plurality of keywords and the importance of each keyword is different, in order to further reduce the process of screening information by the user, in this embodiment, the plurality of keywords are sorted and displayed according to the number of search results corresponding to each keyword. On this basis, the target keyword is set as the first keyword, that is, the keyword with the most support. In this way, it is possible to display first more information corresponding to the target keyword, so that users can directly see the argument with the most support rate.

Continuing to refer to FIG. 5, keywords such as "low calorie", "boiled food is healthy", "indigestible", "high protein", "no oil and salt" and "lose weight" and the like are arranged in descending order according to the number of corresponding search results.

In some embodiments, after S120, when a second trigger operation is detected, the summary of the answer viewpoint is replaced with a second content for display; wherein, the second content includes at least one of keyword summary and target search results, and the keyword summary is generated according to the target search results, and the target search results are search results involving a target keyword in keywords in the target category of search results, and the target keyword is the keyword selected by the second trigger operation.

Optionally, the second trigger operation may include an operation for controlling the display of the second content in the search result interface, such as a gesture control operation, a voice control operation, or an expression control operation on the search result interface. which is not limited here.

Figure 8:
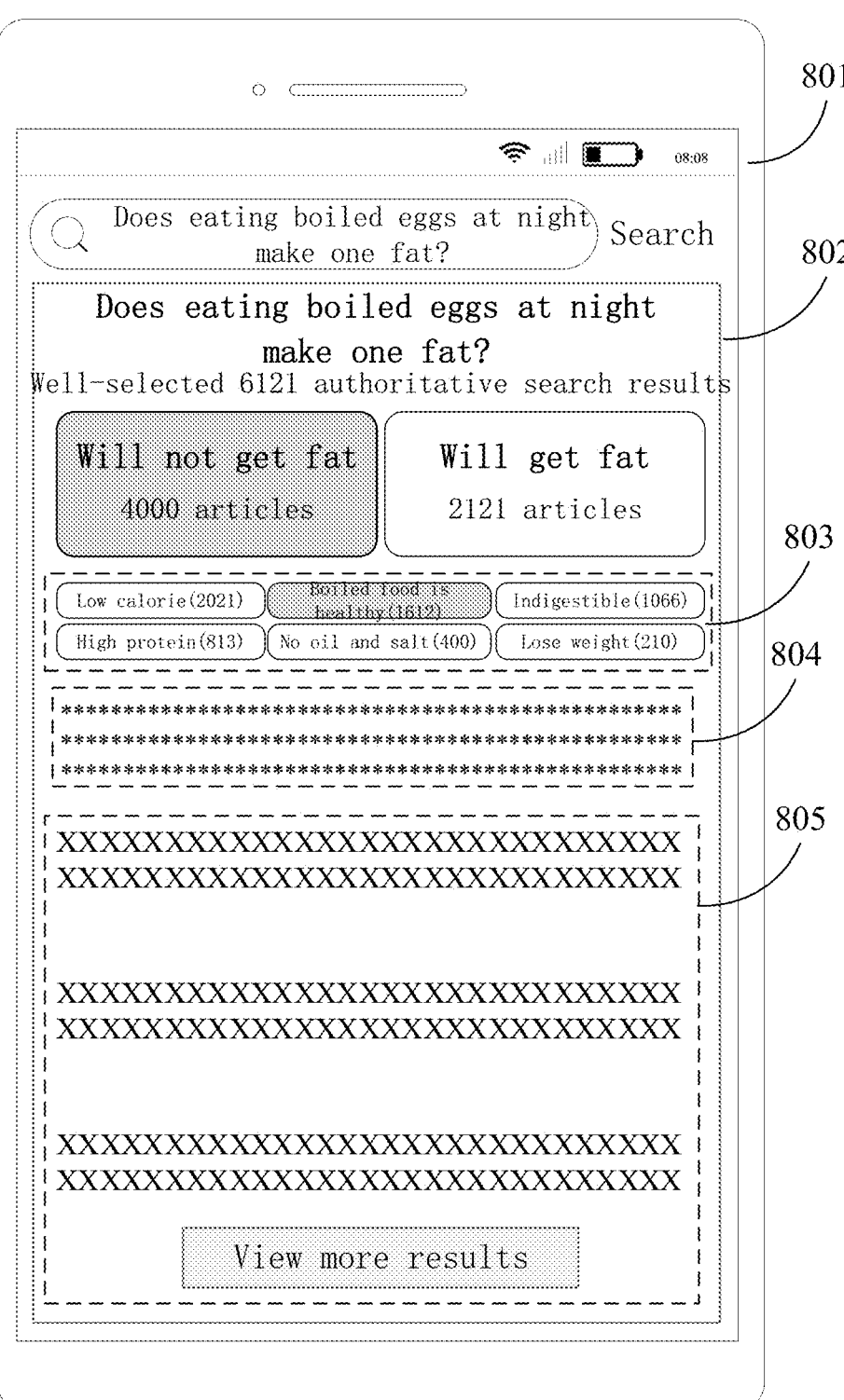
FIG. 8 is a schematic diagram of yet another search result interface provided by an embodiment of the present disclosure.

In this embodiment, the second content is display by the user's trigger operation, and it may be displayed by covering the summary of the answer viewpoint. For example, for the display content of the search result interface 502 in FIG. 5, when a user clicks on a keyword control that triggers "boiled food is healthy", as shown in FIG. 8, in the search result interface 802 in the electronic device 801, the keyword of "boiled food is healthy" is displayed as a selected state, and the target keyword is "boiled food is healthy", and the summary of the answer viewpoint in the middle area 503 of the search result interface 502 is replaced by the keyword summary 804 below the keyword 803 and the target search result 805.

In some embodiments, the target keyword included in the second content is displayed in a selected state. Regardless of whether the second content is a keyword summary or a target search result, words highly relevant to the target keyword are all displayed as selected state. In this way, it is more convenient for the user to quickly locate the content related to the keyword.

In yet another embodiment of the present disclosure, after displaying the first content and the second content, the display method for switching keywords is limited.

In some embodiments, after a plurality of answer viewpoints, first content and second content are displayed in the search result interface, when a fourth trigger operation is detected, the second content is replaced with the fourth content; wherein, the fourth content including at least one of other keyword summaries of other keywords corresponding to the fourth trigger operation, and other search results, the other keyword summaries are generated according to the other search results, and the other search results are search results related to other keywords.

Optionally, the fourth trigger operation may include an operation for controlling the display of the fourth content in the search result interface, such as a gesture control operation, a voice control operation, or an expression control operation on the search result interface, which is not limited here.

In this embodiment, after displaying a plurality of answer viewpoints, first content and second content, if the user clicks and triggers other keywords different from the target keyword in the current search result interface, then in the same area as the second content, the second content is hidden, and the fourth content corresponding to other keywords is displayed.

In addition, in order to highlight other keywords, the target keyword may be displayed in an unselected state, while other keywords corresponding to the fourth trigger operation may be displayed in a selected state. In an embodiment of the present disclosure, there is also provided a content search apparatus, which will be described below with reference to FIG. 9.

In an embodiment of the present disclosure, the content search apparatus may be an electronic device. Wherein, the electronic device may include but not limited to a mobile terminal such as a mobile phone, a notebook, a digital broadcast receiver, a PDA, a PAD, a PMP, a vehicle-mounted terminals (for example, a vehicle-mounted navigation terminal), a wearable device, etc., and a fixed terminal such as a digital TV, a desktop computer, a smart home device, etc.

Figure 9:
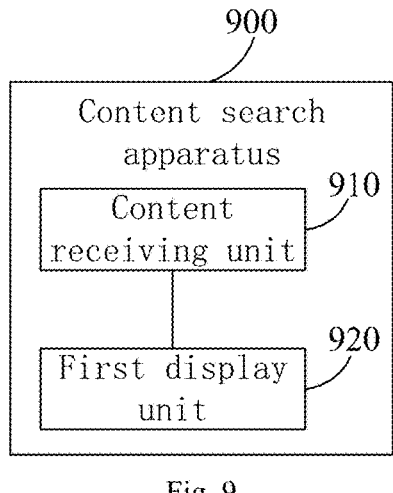
FIG. 9 is a schematic structural diagram of a content search apparatus provided by an embodiment of the present disclosure.

FIG. 9 shows a schematic structural diagram of a content search apparatus provided by an embodiment of the present disclosure.

As shown in FIG. 9. the content search apparatus 900 may include a content receiving unit 910 and a first display unit 920.

The content receiving unit 910 may be configured to receive search content.

The first display unit 920 can be configured to display a plurality of answer viewpoints and first content in the search result interface; wherein, each of the answer viewpoints corresponds to a category of search results, the search results being the results obtained by searching for the search content, and the first content includes keywords, which are used to indicate the reason for displaying a target answer viewpoint among the plurality of answer viewpoints, the keywords being obtained by extracting from a target category of search results corresponding to the target answer viewpoint.

In an embodiment of the present disclosure, when searching for the search content, it is possible to display first content in the search result interface while displaying answer viewpoints corresponding to various search results obtained by searching in the search result interface, for example, keywords extracted from target category of search results corresponding to a target answer viewpoint in these answer viewpoints, then reasons for displaying the target answer viewpoints can be display to the user through the keywords directly without the need for the user to analyze a large number of search results, so that the user can understand the supporting arguments of the target answer viewpoint quickly, improving the comprehensiveness and refinement of search results presented by search engines, thereby improving the efficiency of screening search results and further improving user experience.

In some embodiments, a target answer viewpoint is an answer viewpoint displayed as selected state.

In some embodiments, a plurality of answer viewpoints can be arranged and displayed according to the order of target viewpoints, and the order of target viewpoints is determined according to the number of a category of search results corresponding to each answer viewpoint;

wherein, the target answer viewpoint is the first of the answer viewpoints.

In some embodiments, the content search apparatus further includes a second display unit, which can be configured to display a plurality of answer viewpoints in a search result interface before displaying the plurality of answer viewpoints and a first content in the search result interface;

In this way, the first display unit 920 is further configured to display the first content in the search result interface when a first trigger operation is detected, and the target answer viewpoint is an answer viewpoint selected by the first trigger operation.

In some embodiments, a plurality of answer viewpoints are displayed in the same area, and the first content is displayed in the display area to which the plurality of answer viewpoints belong.

In some embodiments, a plurality of answer viewpoints are displayed in different areas, and the first content is displayed in the display area to which the target answer viewpoint belongs.

In some embodiments, the first content further includes a summary of answer viewpoint, and the summary of answer viewpoint is generated according to a target category of search results.

Further, the first content also includes the number of search results corresponding to each keyword in the target category of search results.

In some embodiments, second content is also displayed in the search result interface;

wherein, the second content includes at least one of a keyword summary and a target search result, and the keyword summary is generated according to the target search result, and the target search result is a search result involved in a target keyword in keywords in the target category of search results.

Further, the target keyword is a keyword displayed in a selected state.

In some embodiments, keywords are arranged and displayed according to the order of target keywords, and the order of target keywords is determined according to the number of search results corresponding to each keyword in the target category of search results;

wherein, the target keyword is the first keyword.

In some embodiments, the content search apparatus further includes a third display unit, which can be configured to, after displaying a plurality of answer viewpoints and first content in the search result interface, when a second trigger operation is detected. replace the summary of the answer viewpoint with the second content for display;

wherein, the second content includes at least one of a keyword summary and a target search result, and the keyword summary is generated according to the target search result, and the target search result is a search result involving in a target keyword in keywords in the target category of search results, and the target keyword is a keyword selected by the second trigger operation.

It should be noted that the content search apparatus 900 shown in FIG. 9 can execute each step in the method embodiments shown in FIG. 1 to FIG. 8. and implement each process and effects in the method embodiments shown in FIG. 1 to FIG. 8, which will not be repeated here.

An embodiment of the present disclosure also provides a content search device, which may include a processor and a memory, and the memory may be used to store executable instructions. Wherein, the processor may be configured to read executable instructions from the memory, and execute the executable instructions to implement the content search method in the above embodiments.

Figure 10:
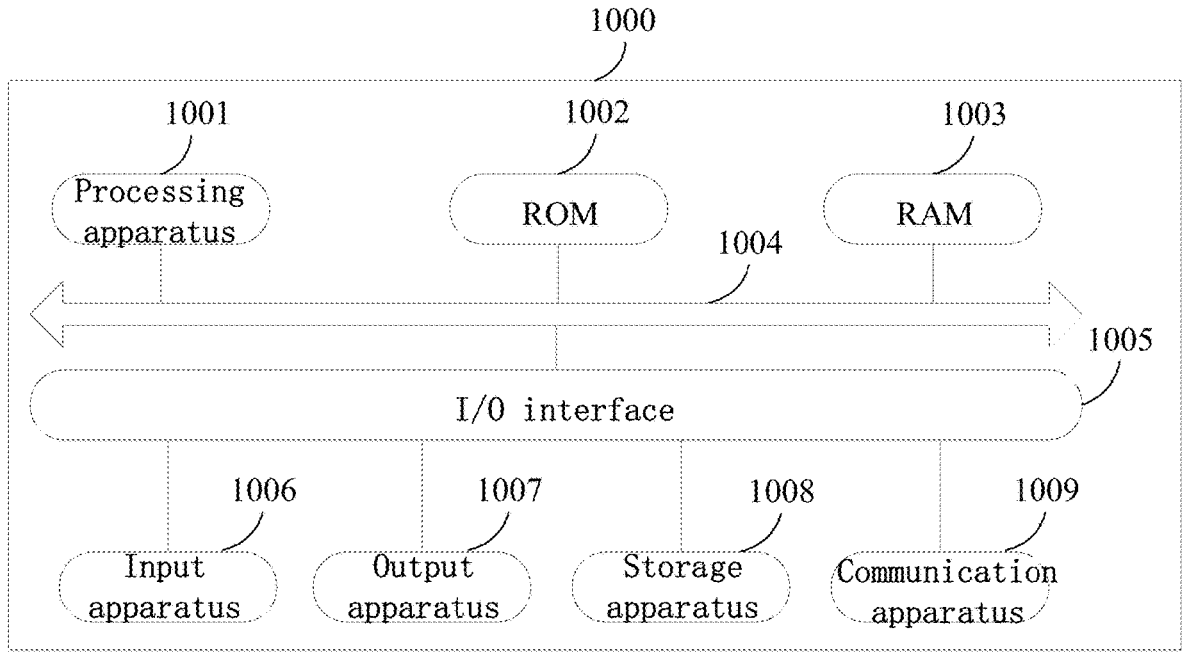
FIG. 10 is a schematic structural diagram of a content search device provided by an embodiment of the present disclosure.

FIG. 10 shows a schematic structural diagram of a content search device provided by an embodiment of the present disclosure.

Referring specifically to FIG. 10 below, it shows a schematic structural diagram of a content search device 1000 suitable for implementing an embodiment of the present disclosure.

The content search device 1000 in the embodiment of the present disclosure may be an electronic device. Wherein, the electronic device may include but not limited to a mobile terminal such as a mobile phone, a notebook, a digital broadcast receiver, a PDA, a PAD, a PMP, a vehicle-mounted terminal (for example, a vehicle-mounted navigation terminal), a wearable device, etc., and a fixed terminal such as a digital TV, a desktop computer, a smart home device, etc.

It should be noted that the content search device 1000 shown in FIG. 10 is only one example, and should not bring any limitation to functions and usage scopes of the embodiments of the present disclosure.

As shown in FIG. 10, the content search device 1000 may include a processing apparatus 1001 (for example a central processing unit, a graphics processing unit, etc.), which can execute various appropriate actions and processes according to a program stored in a read-only memory ROM 1002 or a program loaded from a storage apparatus 1008 into a random-access memory RAM 1003. In the RAM 1003, various programs and data necessary for the operation of the information processing device 1000 are also stored. The processing apparatus 1001, ROM 1002, and RAM 1003 are connected to each other through a bus 1004. An input/output (I/O) interface 1005 is also connected to the bus 1004.

Typically, the following apparatus can be connected to the I/O interface 1005: an input apparatus 1006 including, for example, a touch screen, a touchpad, a keyboard, a mouse, a camera, a microphone, an accelerometer, a gyroscope, etc.; an output apparatus 1007 including, for example, a liquid crystal display (LCD), a speaker, a vibrator, etc; a storage apparatus 1008 including, for example, a magnetic tape, a hard disk, etc.; and a communication apparatus 1009. The communication apparatus 1009 may allow the content search device 1000 to perform wireless or wired communication with other devices to exchange data. Although FIG. 10 shows a content search device 1000 having various apparatus, it should be understood that implementing or possessing all of the illustrated apparatus is not required. More or fewer apparatus may alternatively be implemented or possessed.

An embodiment of the present disclosure also provides a computer-readable storage medium having computer programs stored thereon, which, when executed by a processor, causes the processor to implement the content search method in the above embodiments.

In particular, according to an embodiment of the present disclosure, the processes described above with reference to the flowcharts can be implemented as computer software programs. For example, an embodiment of the present disclosure includes a computer program product, which includes computer programs carried on a non-transitory computer readable medium, where the computer program includes program code for executing the method shown in the flowchart. In such an embodiment, the computer program may be downloaded and installed from a network through the communication apparatus 1009, or installed from the storage apparatus 1008, or installed from the ROM 1002. When the computer program is executed by the processing apparatus 1001, the above functions defined in the content search method of the embodiment of the present disclosure are executed.

It should be noted that the above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP, and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be contained in the above content search device; or it may exist alone without being assembled into the content search device.

The above computer-readable medium carries one or more programs, which, when executed by the content search device, cause the content search device to perform:

receiving a search content; displaying a plurality of answer viewpoints and first content in a search result interface; wherein, each of the answer viewpoints corresponds to a category of search results, the search results being the results obtained by searching for the search content, and the first content includes keywords, which are used to indicate the reason for displaying a target answer viewpoint among the plurality of answer viewpoints, the keywords being obtained by extracting from a target category of search results corresponding to the target answer viewpoint.

In an embodiment of the present disclosure, the computer program code for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a content search device, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession may be actually executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims.

What is claimed is:

1. A content search method, comprising:
receiving a search content;
sending the search content to a server, wherein the server searches for the search content in a database to obtain search results related to the search content, and extracts information from the search results to obtain a plurality of answer viewpoints corresponding to the search results and keywords supporting each of the answer viewpoints;
receiving the search results, the plurality of answer viewpoints, and the keywords from the server;

displaying the plurality of answer viewpoints and a first content in a search result interface;
wherein, each of the answer viewpoints corresponds to a category of the search results, and the first content includes the keywords from arguments supporting a first answer viewpoint among the plurality of answer viewpoints, which are configured to indicate a reason for displaying the first answer viewpoint, the keywords being obtained by:
extracting a keyword set from a first category of the search results corresponding to the first answer viewpoint;
calculating a correlation between each keyword in the keyword set and the first answer viewpoint; and
selecting a plurality of the keywords according to the calculated correlation for each keyword; and
in response to an operation for selecting a keyword from the keywords in the first content displayed, displaying a second content in the search result interface, wherein the second content includes a keyword summary generated for the selected keyword, and the keyword summary is generated according to the search results involving the selected keyword in the first category of the search results corresponding to the first answer viewpoint.

2. The content search method according to claim 1, wherein the first answer viewpoint is an answer viewpoint displayed in a selected state.

3. The content search method according to claim 1, wherein the plurality of answer viewpoints are arranged and displayed according to an order determined according to a number of the category of the search results corresponding to each of the answer viewpoints;
wherein, the first answer viewpoint is a first of the plurality of answer viewpoints.

4. The content search method according to claim 1, wherein, before displaying the plurality of answer viewpoints and the first content in the search result interface, the content search method further comprises:
displaying the plurality of answer viewpoints within the search result interface;
wherein the displaying the plurality of answer viewpoints and the first content in the search result interface comprises:
when a first trigger operation is detected, the first content is displayed in the search result interface, the first answer viewpoint being an answer viewpoint selected by the first trigger operation.

5. The content search method according to claim 1, wherein the plurality of answer viewpoints are displayed in a same area, and the first content is displayed in a display area to which the plurality of answer viewpoints belong.

6. The content search method according to claim 1, wherein the plurality of answer viewpoints are displayed in different areas, and the first content is displayed in a display area to which the first answer viewpoint belongs.

7. The content search method according to claim 1, wherein the first content further includes a number of the search results corresponding to each of the keywords in the first category of the search results.

8. The content search method according to claim 1, wherein the second content further includes the search results involving the selected plurality of keywords in the first category of the search results.

9. The content search method according to claim 8, wherein the selected plurality of keywords is displayed in a selected state.

10. The content search method according to claim 8, wherein the selected plurality of keywords are arranged and displayed according to an order determined according to a number of the search results corresponding to each of the keywords in the first category of the search results;

wherein a first of the selected plurality of keywords is the selected keyword before receiving the operation for selecting the keyword.

11. The content search method according to claim 1, wherein the first content further includes a summary of the first answer viewpoint, which is generated according to all search results of the first category of the search results corresponding to the first answer viewpoint, and wherein displaying the second content in the search result interface comprises:

replacing a summary of the answer viewpoints with the second content for display.

12. A content search device, comprising:

a processor; and a memory configured to store executable instructions;

wherein, the processor is configured to read the executable instructions from the memory, and execute the executable instructions to:

receive a search content;

send the search content to a server, wherein the server searches for the search content in a database to obtain search results related to the search content, and extracts information from the search results to obtain a plurality of answer viewpoints corresponding to the search results and keywords supporting each of the answer viewpoints;

receive the search results, the plurality of answer viewpoints, and the keywords from the server;

display the plurality of answer viewpoints and a first content in a search result interface;

wherein each of the answer viewpoints corresponds to a category of the search results, and the first content includes the keywords from arguments supporting a first answer viewpoint among the plurality of answer viewpoints, which are configured to indicate a reason for displaying the first answer viewpoint, the keywords being obtained by:

extracting a keyword set from a first category of the search results corresponding to the first answer viewpoint;

calculating a correlation between each keyword in the keyword set and the first answer viewpoint; and selecting a plurality of the keywords according to the calculated correlation for each keyword; and in response to an operation for selecting a keyword from the keywords in the first content displayed, displaying a second content in the search result interface, wherein the second content includes a keyword summary generated for the selected keyword, and the keyword summary is generated according to the search results involving the selected keyword in the first category of the search results corresponding to the first answer viewpoint.

13. The content search device according to claim 12, wherein the plurality of answer viewpoints are arranged and displayed according to an order determined according to a number of the category of the search results corresponding to each of the answer viewpoints;

wherein, the first answer viewpoint is a first of the plurality of answer viewpoints.

14. The content search device according to claim 12, wherein, the processor is further configured to execute the executable instructions to:

display the plurality of answer viewpoints within the search result interface before displaying a plurality of answer viewpoints and the first content in the search result interface;

wherein, the displaying the plurality of answer viewpoints and the first content in the search result interface comprises:

when a first trigger operation is detected, the first content is displayed in the search result interface, the first answer viewpoint being an answer viewpoint selected by the first trigger operation.

15. The content search device according to claim 12, wherein the second content further includes the search results involving the selected plurality of keyword in the first category of the search results.

16. The content search device according to claim 15, wherein the selected plurality of keywords are arranged and displayed according to an order determined according to a number of the search results corresponding to each of the keywords in the first category of the search results;

wherein a first of the keywords is the selected keyword before receiving the operation for selecting the keyword.

17. The content search device according to claim 12 wherein the first content further includes a summary of the first answer viewpoint, which is generated according to all search results of the first category of the search results corresponding to the first answer viewpoint, and wherein displaying the second content in the search result interface comprises:

replacing a summary of the answer viewpoints with the second content for display.

18. A non-transitory computer-readable storage medium having computer programs stored thereon, which, when executed by a processor, causes the processor to execute instructions of:

receiving a search content;

sending the search content to a server, wherein the server searches for the search content in a database to obtain search results related to the search content, and extracts information from the search results to obtain a plurality of answer viewpoints corresponding to the search results and keywords supporting each of the answer viewpoints;

receiving the search results, the plurality of answer viewpoints, and the keywords from the server;

displaying the plurality of answer viewpoints and a first content in a search result interface;

wherein, each of the answer viewpoints corresponds to a category of the search results, and the first content includes the keywords from arguments supporting a first answer viewpoint among the plurality of answer viewpoints, which are configured to indicate a reason for displaying the first answer viewpoint, the keywords being obtained by:

extracting a keyword set from a first category of the search results corresponding to the first answer viewpoint;

calculating a correlation between each keyword in the keyword set and the first answer viewpoint; and selecting a plurality of the keywords according to the calculated correlation for each keyword; and in response to an operation for selecting a keyword from the keywords in the first content displayed, displaying a second content in the search result interface, wherein the second content includes a keyword summary generated for the selected keyword, and the keyword summary is generated according to the search results involving the selected keyword in the first category of the search results corresponding to the first answer viewpoint.

\* \* \* \* \*